April 14, 1925.

J. R. JOHNSON 1,533,704

DRUM TYPE MILLING MACHINE

Filed Oct. 17, 1921      5 Sheets-Sheet 1

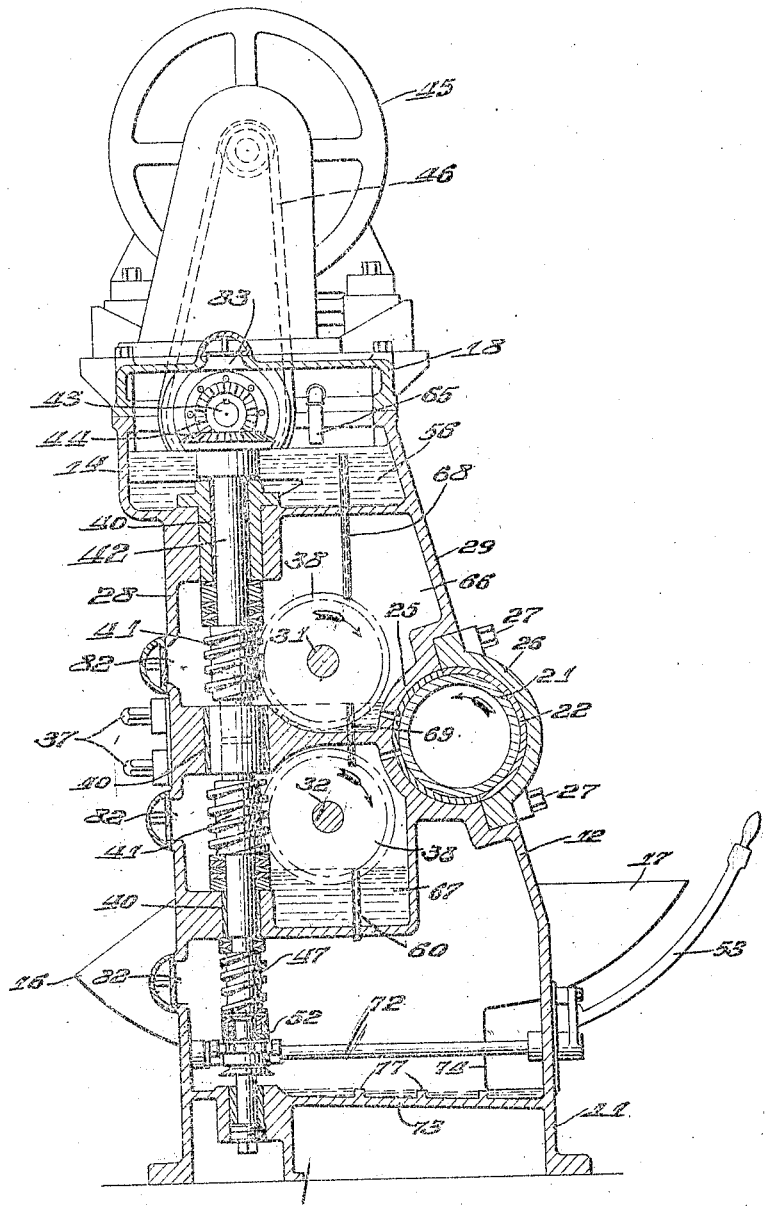

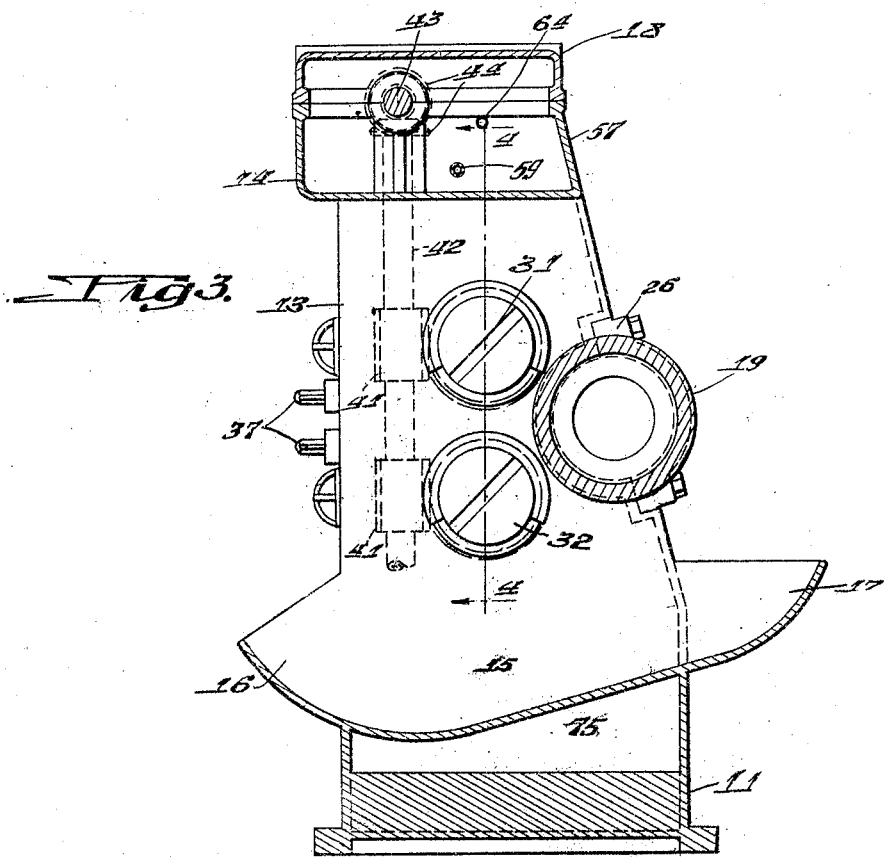

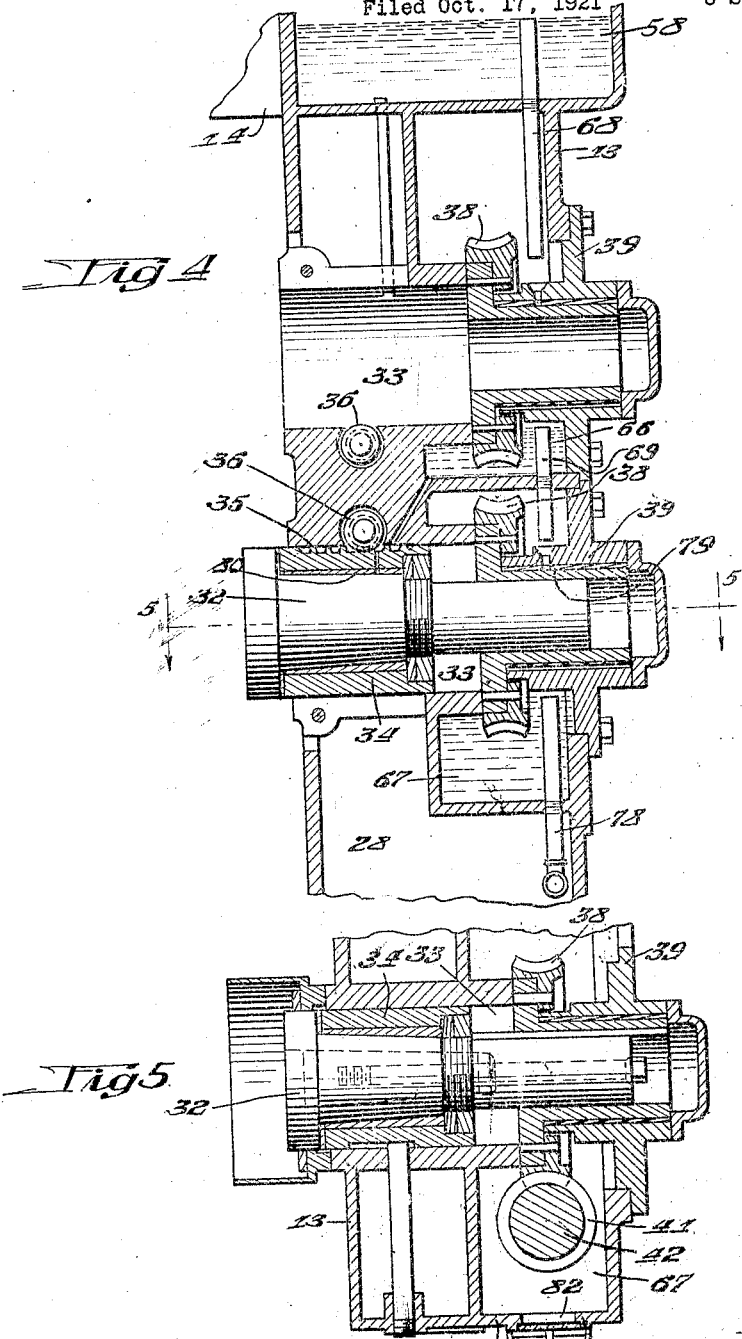

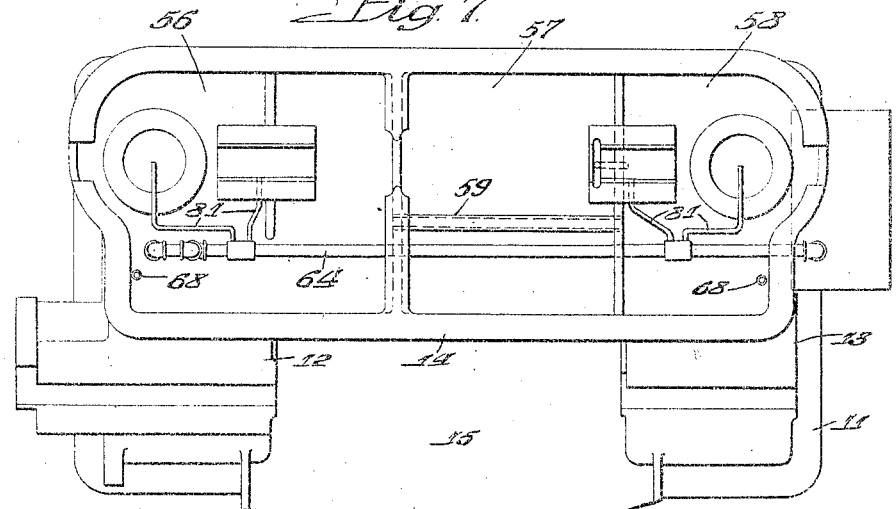

Patented Apr. 14, 1925.

1,533,704

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

DRUM-TYPE MILLING MACHINE.

Application filed October 17, 1921. Serial No. 508,341.

*To all whom it may concern:*

Be it known that I, JOHN R. JOHNSON, a citizen of the United States, residing at Rockford, in the county of Winnebago and State of Illinois, have invented certain new and useful Improvements in Drum-Type Milling Machines, of which the following is a specification.

This invention relates to metal surfacing machines such as milling machines of the drum type disclosed in my United States Letters Patent No. 1,414,812; and the primary object is to generally simplify and improve machines of this character.

More particularly, I have aimed to provide a one-piece base, side housings and top plate, which gives a rigid and sturdy frame structure and mounting for the rotary work drum and spindles and promotes economy in the manufacture of the machine.

Another object is to locate the spindles and driving mechanism in each side housing in a novel manner.

Still another object is to so construct a drum type milling machine as to enable the use of a novel oiling system, providing continuous lubrication of practically all bearings by a gravity or cascade feed through the side housings.

My invention also contemplates other objects with reference to the frame construction, the mounting of the spindles and work drum and the driving mechanism therefor.

Other objects and attendant advantages will be appreciated by those familiar with this art as the invention becomes better understood by reference to the following description when considered in connection with the accompanying drawings, in which:

Figure 1 is a rear elevation of a drum type milling machine embodying my invention;

Figs. 2 and 3, are vertical sections through the machine taken substantially on the lines 2—2 and 3—3, respectively, of Fig. 1;

Fig. 4, is a vertical section taken substantially on the line 4—4 of Fig. 3;

Fig. 5, is a horizontal section taken on the line 5—5 of Fig. 4;

Fig. 6, is a fragmentary view, partly in elevation and section of the front of the machine, not showing the spindles, but illustrating in dotted lines the oiling system; and Fig. 7 is a top view of the frame casting shown in Fig. 6, together with the oil pipes at the top of the frame.

Figure 1:
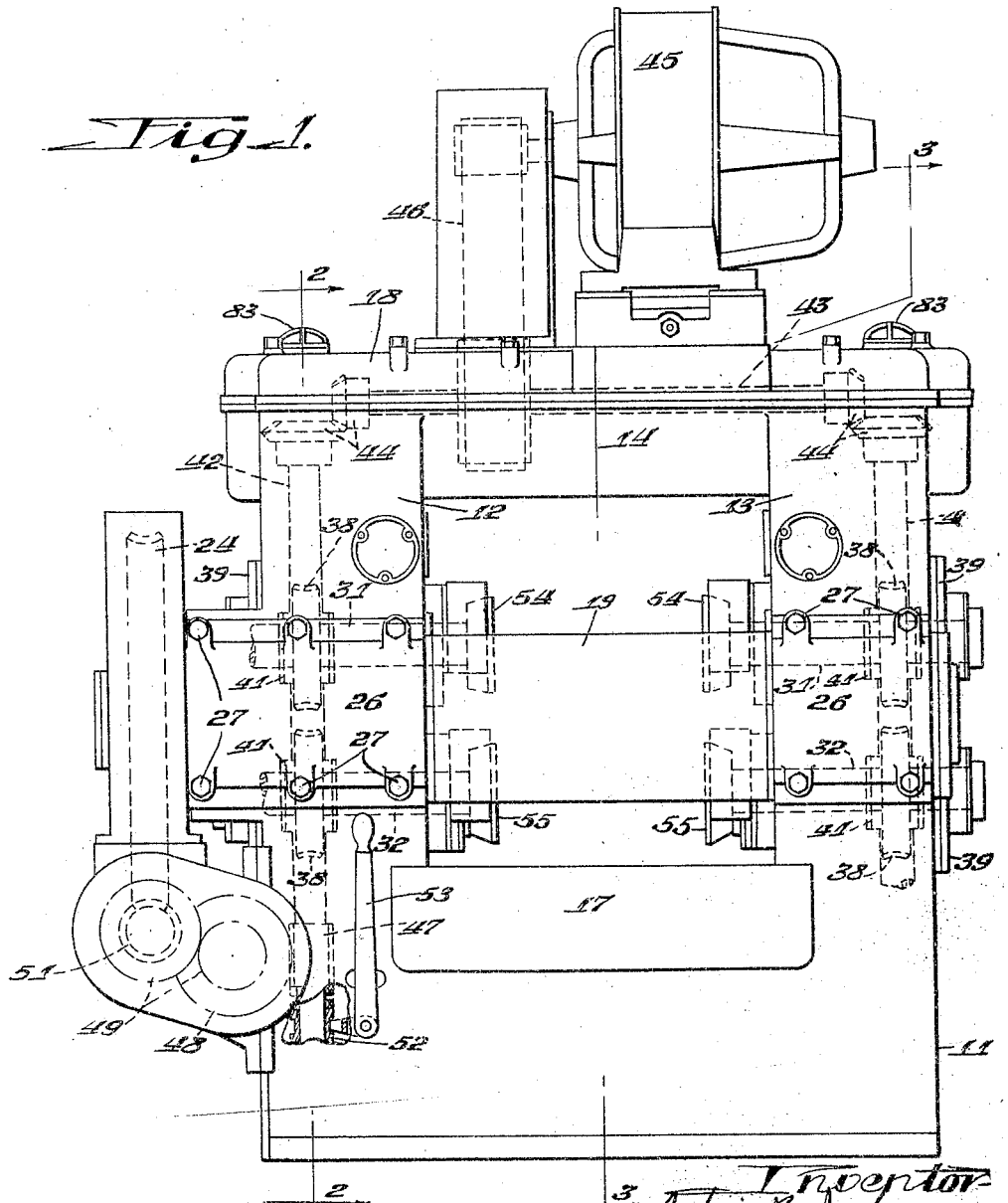

In a drum type milling or surfacing machine, the work-pieces are carried in circumferentially spaced relation on a rotary drum or work fixture supported by and between side housings, and by rotation of the drum the work-pieces are moved in succession between milling cutters or suitable surfacing tools mounted on the side housings. The work drum and cutters are so relatively arranged that the work-pieces may be loaded and unloaded at one side of the machine. The surfacing operation may be continuous or intermittent according to the shape and arrangement of the work-pieces on the drum; and inasmuch as these machines are intended primarily for heavy duty milling and continuous operation, extreme rigidity and durability in the construction is required in order to produce the desired class of work.

In the present invention, I have aimed to simplify and generally improve the design and construction of machines of this character, in part by providing a frame structure including a base, side housings and top plate preferably of one integral piece, cast to the desired shape. Referring now to the drawings, it will be observed that the one-piece casting is shaped to provide a rectangular base 11, side housings 12 and 13, and a top plate 14, these reference characters being general. Each of these frame portions is of hollow formation and includes partitions or other interior frame structure for purposes which will be presently apparent. The frame may also be shaped to provide integral therewith a drain and chip trough 15 intermediate the side housings and having overhanging front and rear aprons 16 and 17 respectively, which slope downwardly and inwardly. The top plate portion of the frame forms a reservoir or a series of reservoirs for both the lubricant and cutting compound. It also serves as a casing for the overhead driving mechanism, and is closed on its top by a cover plate designated generally by 18.

The rotary work-carrying structure or drum may be of any suitable or preferred construction and in the present instance comprises a cylindrical body 19 located between the side housings and having reduced trunnion ends 21 journaled in bearings 22 on the housings, one of said trunnion ends having an annular flange 23 which carries a worm wheel 24 for revolving the drum, as will be explained later. As shown in Fig. 2, the trunnion bearing blocks are formed in two parts, one comprising the frame portion 25 integral with the main frame and the other a bearing cap 26 secured to the frame by bolts 27. It will be observed that the front walls 28 of the housings are vertically disposed while the rear walls 29 are inclined so as to provide a restricted top structure. By reason of this construction and of locating the drum close to the rear wall greater freedom and space for loading and unloading is provided. The work-pieces may be secured on the drum structure in any suitable or preferred manner such as by means of a special fixture for each different work-piece, which fixture when associated with the drum becomes as it were, a part thereof. Consequently the work-carrying means and drum are referred to synonymously herein.

The cutter spindles are built into the side housings and in the present machine a pair of spindles is mounted on each housing for carrying roughing and finishing cutters. As shown in Figs. 2 and 3, the roughing and finishing cutter spindles 31 and 32 respectively, are disposed in a vertical plane substantially midway between the front and rear walls 28 and 29, with the roughing cutter spindle above, and the other below the horizontal axis of the drum. The spindles, their mounting and immediate drive mechanism may be of any suitable or preferred construction and as shown are typical of what is disclosed and claimed in my companion application Serial Number 508,340. The spindle construction shown in Fig. 4 is duplicated in housing 12. Each housing is shaped to provide cylindrical bearing 33 for each spindle, in which bearing is axially slidable a sleeve 34 in which the spindle revolves. Each spindle sleeve has a rack face 35 engaged by a spur pinion 36 adapted to be rotated by a shaft 37 projecting beyond the front of the machine for feeding the spindle axially. A worm gear splined on the spindle has a hub bearing in an end plate 39 bolted to the outer wall of the side housing. The spindle 32 and its sleeve 34 constitute a unit assembly adapted to be placed in position from either the inner or the outer side of the housing; whereas the worm gear 38 and the end plate 39 constitute another unit assembly adapted to be applied from the outer side of the housing as explained in my last mentioned application. In the present case, however, the worm wheels 38 are driven by worms 41 fixed to or integral with, a vertical shaft 42 journaled in suitable bearings 40 in the housing within the walls thereof. The shaft 42 may be of sectional construction as shown, and is in effect, a single driving shaft, suitable thrust bearings being provided to take the thrust from the cutters. Each shaft 42 is driven at its upper end from a horizontal shaft 43 through the agency of bevel gears 44. The shaft 43 in turn may be driven by any suitable mechanism, such for example as a motor 45 mounted on the top structure and connected by a silent link chain 46 directly to the shaft 43.

The spindle driving shaft 42 in the housing 12 is equipped adjacent to its lower end with a loose worm 47 meshing with a worm gear 48, which in turn is connected to the worm gear 24 through the agency of pick-off change speed gears 49 and a worm 51. A suitable clutch is provided including a shiftable element 52 adapted to be operated by the hand lever 53 for connecting the worm 47 to the shaft 42. By means of the lever 53 the drive of the drum is controlled. From the foregoing, it will be manifest that when the motor is in operation the spindles on both housings will be revolved in a clockwise direction viewing Fig. 2; and with the clutch 52 engaged, the drum 19 will be revolved in a counter-clockwise direction, it being noted that the drum is driven through the agency of one of the spindle driving shafts.

In operation, the work-pieces are loaded onto the drum at the rear of the machine and are carried in succession between the roughing cutters 54 on the upper spindles and the finishing cutters 55 on the lower spindles, and in the present example are removed from the drum as they are carried upwardly at the back of the machine. It should be noted, however, that my invention is not limited to the means or method of loading and unloading.

Attention is now directed to the construction of the machine with reference to the continuous, gravity oiling system. The top plate portion of the frame is shaped as shown plainly in Figs. 6 and 7 to provide an elongated open trough which serves both as a reservoir and compartment for part of the driving mechanism. In the present example, the trough is divided by transverse partitions into reservoirs 56, 57 and 58. The reservoirs 56 and 58, positioned directly above the side housings 12 and 13 respectively, are connected by a pipe 59 and each is adapted for carrying a supply of oil for lubricating various driving elements and bearings. The reservoir 57 is utilized for carrying a supply of cutting compound or other solution for the cutters. The oil is delivered to the reservoirs 56 and 58 from a tank or well 61 in the base, by means of a pump contained in the casing 62 and driven by a shaft 63, the oil delivery being by means of a pipe 64 having a discharge end 65 emptying into the reservoir 56. Each side housing is partitioned interiorly to provide oil catch basins 66 and 67 into which the oil cascades or feeds by gravity through overflow pipes. These oil basins are in effect, compartments separately enclosing the worm gears 38, and an oil level is maintained in each basin or compartment so that the spindle driving gears dip or run in the oil. An overflow pipe 68 supplies oil from each upper reservoir to the basin 66, and an overflow pipe 69 maintains the level in the basin 66 and supplies oil to the lower basin 67 as shown in Fig. 6. An overflow pipe 60 from the basin 67 in the housing 12 supplies oil to the basin 70 in which the drum driving worm 51 is located. An overflow outlet 71 from the basin 69, maintaining the oil at the proper level therein, discharges into a compartment 72 which has a bottom 73 inclined downwardly toward the back of the machine. At the lower end of this incline there is a discharge opening 74 communicating with compartment 75 which also has an inclined bottom 76, the lower end of which discharges into the tank 61. Each inclined bottom wall 76 has a series of small dams 77. It will be observed that the oil overflowing from the several basins and the different points of consumption discharges into the compartment 72 through the outlet 71 and a pipe 78, the delivery end of the latter being shown in Fig. 6. This discharging oil falls onto the worm 47 at the front of the machine and drains onto the high end of the bottom 73. It will thus be seen that the oil having passed through the machine will be carried over the small dams 77, thereby precipitating any foreign matter and also cooling the oil. By utilizing a continuous oiling system of the character disclosed herein which it will be observed is confined within the walls of the frame, all of the moving or operating parts and bearings will be self-lubricated where required, it being noted that oil holes and grooves are provided so that the various bearings, for example the spindle bearings 80 and the worm gear bearings 79, will be oiled and the surplus will drain back back into the basins. The gears 38 carry the oil to the worms 41. The bearings for the shaft 42 will be lubricated by gravity feed from the top reservoir down through the several bearings. The drum bearings will be lubricated through suitable oil passages leading from the oil basin 66. As shown in Fig. 7, the oil supply pipe 64 has leads 81 to the bearings for the shaft 43 and to a point above the gears 44, thus providing constant lubrication for these parts. Sight openings 82 are provided at the front of the machine in front of each worm, and in the cover plate at 83 above each spindle driving shaft. These sight openings are provided at any critical point so that the attendants may inspect the machine from time to time to see that the oil system is properly functioning. Each sight opening is closed by a suitable window properly protected as shown.

It will be evident from the foregoing that the frame structure is very effectively utilized in promoting economy both in the manufacture and operation of surfacing machines. Machines of this character are therefore, especially well adapted for continuous operation in the surfacing of castings and forgings of all sizes and shapes, where quantity production is required. And while I have illustrated but a single working embodiment, it should be understood that considerable change might be made in the construction and arrangement without departing from the spirit and scope of the invention as expressed in the appended claims.

I claim:

1. A drum type milling machine, comprising, in combination, an integral frame structure including laterally spaced upright hollow column housings joined by a base portion and a hollow top portion and shaped at its top to provide an interior oil reservoir, a rotary work-carrying drum and tool spindles mounted on the housings, mechanism for rotating the drum and spindles, and means providing a circulation of oil from said reservoir down through the housings for lubricating said mechanism and parts driven thereby.

2. A drum type metal work machine, comprising, in combination, a rigid frame structure including laterally spaced upright hollow column housings, a rotary work-carrying drum interposed between and mounted on the housings, one of the housings being shaped to provide an upper oil reservoir and to further provide at lower positions spindle mounting supports and an oil retaining basin beneath each support, tool spindles mounted in said supports, mechanism for rotating the drum and spindles including a gear on each spindle adapted to dip in oil in the basin therebelow, means for delivering oil to said reservoir, and means for causing oil to overflow from said reservoir to said basins.

3. In a drum type milling machine having a rotary work-carrying drum and surface milling tool spindles for surfacing work-pieces carried between them by the drum, an integral frame structure having laterally spaced upright housings on which the drum and spindles are mounted and being shaped beneath the drum to provide a chip and drain trough intermediate the housings.

4. A drum type metal surfacing machine comprising an integral base, side housings and a trough shaped top joining the side housings, a rotary drum carried by and between said housings, cutter spindles on the housings, a cover for said top, and the mechanism in the top having driving connection with the drum and spindles, said trough being adapted to contain lubricant for the cutter spindles and said mechanism.

5. A drum type milling machine, comprising, in combination, a frame structure including laterally spaced upright housings, a work-carrying drum interposed between and mounted on the housings, vertically spaced surface milling tool spindles mounted on one of the housings, mechanism for rotating the drum and spindles including a driving train extending vertically through said housing and connected by gearing to said spindles, a gear fixed to the drum, and a driving train from the lower end of said vertical driving train terminating in a pinion located below and in mesh with the drum gear.

6. A drum type continuous milling machine, comprising, in combination, laterally spaced upright housings, a rotary work-carrying drum interposed between the supported on the housings, surface milling tool spindles on each housing for surfacing workpieces carried between them by the drum, a vertical spindle-driving shaft on each housing connected by gearing to the spindles, mechanism for driving said shafts, and a drum-driving worm on the lower end of one of said shafts connected by gearing to the drum.

7. A drum type continuous milling machine, comprising, in combination, laterally spaced upright housings, a rotary work-carrying drum interposed between and supported on the housings, surface milling tool spindles on each housing for surfacing workpieces carried between them by the drum, a vertical spindle-driving shaft on each housing connected by gearing to the spindles, mechanism for driving said shafts, and a driving train between the lower end of one of said shafts and the drum including a clutch, change-speed gearing, a gear fixed to the drum, and a pinion gear below and in mesh with the drum gear and driven by said change-speed gearing.

8. A drum type metal working machine, comprising, in combination, a frame structure having laterally spaced upright hollow column housings joined at the bottom by a compartment for the passage of lubricant to an oil well, a rotary work-carrying drum and tool spindles mounted on the housings, mechanism for rotating the drum and spindles, an oil reservoir at the top of said frame structure, and means providing for circulation of oil down through the housings for lubricating said mechanism and causing the oil to flow through said bottom compartment to said oil well.

9. A machine as set forth in claim 8, in which the bottom compartment has a series of precipitating dams.

10. A drum type metal surfacing machine comprising, in combination, a base, upright side housings thereon, a top plate structure joining the upper ends of the side housings and providing an oil reservoir, a rotary drum and cutter spindles carried by the side housings, mechanism for revolving the drum and spindles, and means providing an overflow oil feed from said reservoir to said driving mechanism and parts driven thereby.

11. In a drum type metal surfacing machine, a base, upright hollow column side housings thereon, a rotary work drum carried by and between the housings, cutter spindles mounted on the housings, mechanism for revolving the drum and spindles, oil catch basins within the housings for supplying oil to said driving mechanism, and means for replenishing the oil basins.

12. In a drum type metal surfacing machine, an integral base, side housings and a top plate forming a one-piece frame, a rotary drum and cutter spindles carried by and between the housings, mechanism for revolving the drum and spindles, the top plate being shaped to provide an oil reservoir, and the side housings being shaped to provide catch basins adapted to receive oil from said reservoir and supply it to said mechanism.

13. In a drum type metal surfacing machine, a base, upright side housings thereon, a top plate joining the upper ends of the housings and carrying an oil reservoir, a rotary work drum and cutter spindles carried by the housings, mechanism for revolving the drum and spindles, oil catch basins on the housings for supplying oil to said driving mechanism, and means for causing oil to feed from the reservoir to said basins.

14. In a drum type metal surfacing machine, an integral base, upright side housings and top plate forming a one-piece frame, the top plate shaped to provide a plurality of compartments adapted for housing driving mechanism and for reservoir purposes, a rotary work drum and cutter spindles carried by the side housings, driving mechanism in said top compartment for operating revolving parts of the machine, and means for oiling said mechanism and revolving parts with oil supplied from said reservoir compartment.

15. A drum type milling machine comprising a base, upright side housings thereon, a top structure joining the upper ends of the housings and forming a reservoir, a rotary drum and cutter spindles carried by the housings, driving mechanism carried by the top structure, driving connections within the housings between said mechanism drum and spindles, and means providing gravity feed of oil through said housings from said reservoir to said driving connections.

16. A drum type milling machine comprising a base, upright side housings thereon, a top structure joining the upper ends of the housings and forming a reservoir, a rotary drum supported by and between the housings, vertically spaced cutter spindles mounted on each housing, means for driving the spindles, and means for cascading the oil from said reservoir to said spindles and the driving means therefor.

17. A drum type milling machine comprising a base, upright side housings thereon, a top structure joining the upper ends of the housings and forming a reservoir, a rotary drum supported by and between the housings, vertically spaced cutter spindles mounted on each housing, means for driving the spindles, a worm gear drive for each spindle, an oil basin in which each worm gear revolves, and means for feeding oil from said reservoir to said oil basin.

18. A drum type milling machine comprising a base, upright side housings thereon, a top structure joining the upper ends of the housings and forming a reservoir, a rotary drum supported by and between the housings, vertically spaced cutter spindles mounted on each housing, means for driving the spindles, a worm gear drive for each spindle, an oil basin in which each worm gear revolves, means for feeding oil from said reservoir to said oil basins, and a precipitating drain from said basins terminating in an oil well in the base.

19. A drum type metal surfacing machine comprising an integral base, side housings and a trough shaped top joining the side housings, a rotary drum carried by and between said housings, cutter spindles on the housings, a cover for said top, mechanism in the top having driving connections with the spindles and drum, said trough forming an oil reservoir, and means for causing oil to feed from said reservoir for oiling said driving connections and the spindles.

20. A drum type milling machine comprising a base, upright side housings thereon, a trough shaped top plate joining the upper ends of the side housings, a work drum and cutter spindles carried by the side housings, means in said housings for driving the spindles, oil catch basins in said housings for supplying oil to said driving means, said trough providing an oil reservoir, and means for feeding oil from said trough to said basins.

21. In a metal surfacing machine of the character described, a base, upright hollow column side housings on the base, a work drum carried by and between the housings, vertically spaced cutter spindles mounted in each housing, means in each housing for driving said spindles, each housing being shaped interiorly to provide oil catch basins associated with said spindle driving means, and means for feeding oil to said basins for oiling said spindles and driving means.

22. A metal surfacing machine of the character described comprising a base, upright hollow column side housings thereon, a rotary work drum carried by and between the side housings, a plurality of cutter spindles mounted on each housing and adapted for carrying a cutter at the inner side thereof, each housing being partitioned interiorly to provide oil basin compartments adapted for supplying oil to the spindles and their driving means, and spindle driving means passing through said compartments.

23. A drum type milling machine comprising a base, upright side housings thereon, a top plate structure joining the upper ends of said housings and providing an oil reservoir, a rotary work drum carried by and between the housings, a cutter spindle mounted on each housing and adapted for carrying a cutter at the inner side thereof, driving mechanism supported on said top structure, a driving train between said mechanism and the spindles, and means for oiling said driving train by gravity feed from oil in said reservoir.

24. A drum type milling machine comprising a base, upright side housings rigidly mounted on the base, a top plate structure rigidly uniting the upper end of the side housings, a cover plate on said top plate, the top plate and cover providing an oil reservoir and a casing for driving mechanism, a work drum interposed between the side housings and revolubly mounted thereon, cutter spindles mounted on the side housings, a motor mounted on the cover plate, and motor driven mechanism disposed in said top casing and connected with the drum and cutter spindles for revolving the same.

25. A drum type milling machine comprising a base, upright side housing thereon, a top structure joining the upper ends of the side housings and forming an oil reservoir, a rotary work-carrying drum interposed between and supported on the side housings, cutter spindles on one of said side housings, mechanism for revolving the work drum and spindles, and means providing gravity feed of oil through said side housings from said reservoir to the spindle-driving mechanism.

26. In a drum type milling machine, the combination of spaced upright side housings, a rotary work drum carried by and between the side housings, a cutter spindle on one of the side housings for milling work on the drum, means for driving the spindle and drum, the spindle-carrying side housing being shaped to provide an oil basin for lubricating the spindle-driving means, and means for feeding oil to said basin.

27. In a drum type milling machine, the combination of spaced upright side housings, a rotary work drum carried by and between the side housings, upper and lower cutter spindles mounted on each side housing, means for driving said spindles and drum, each side housing being shaped to provide an oil catch basin associated with the driving means for each spindle, and means for feeding oil to the upper basins from which it overflows to the lower basins.

28. In a drum type milling machine, the combination of spaced upright side housings, a rotary work drum carried by and between the side housings, a cutter spindle on each side housing for milling work on the drum, means for driving the work drum including a gear on the drum and a driving pinion located beneath the drum, means for driving the spindles, and means for lubricating the spindle-driving means and for causing the lubricant to overflow for lubricating said drum-driving means.

29. In a drum type milling machine, spaced side housings, a rotary work-carrying drum supported upon and between the side housings, cutter spindles mounted in bearings in each side housing for milling work on the drum, and spindle-driving means in each housing, each housing being shaped interiorly to provide oil catch basins for lubricating the spindle-driving means therein.

30. In a drum type milling machine, the combination of a frame structure including laterally spaced upright housings, and a rotary work-carrying drum and surface milling tool spindles mounted on said housings, the base portion of said frame structure being shaped to provide a chip trough intermediate the housings.

31. A drum type milling machine as set forth in claim 30, in which the chip trough has a larger throat at the front than at the rear of the machine to provide for removal of chips.

32. In a drum type milling machine, the combination of a frame structure including laterally spaced upright housings, and a rotary work-carrying drum and surface milling tool spindles mounted on said housings, the base portion of the frame structure having a sunken top intermediate the housings providing a chip trough and permitting location of the drum relatively close to the base.

JOHN R. JOHNSON.